United States Patent
Brice

(10) Patent No.: US 12,417,664 B1
(45) Date of Patent: Sep. 16, 2025

(54) METHOD OF MANAGING USER MOVEMENT IN AN AREA

(71) Applicant: Accesso Technology Group Plc, Twyford (GB)

(72) Inventor: Kevin Brice, Oceanside, CA (US)

(73) Assignee: Accesso Technology Group Plc, Twyford (GB)

( * ) Notice: Subject to any disclaimer, the term of this patent is extended or adjusted under 35 U.S.C. 154(b) by 0 days.

(21) Appl. No.: 18/949,116

(22) Filed: Nov. 15, 2024

(51) Int. Cl.
G07C 9/28 (2020.01)
G06Q 10/02 (2012.01)
G09F 13/00 (2006.01)

(52) U.S. Cl.
CPC ............. *G07C 9/28* (2020.01); *G06Q 10/02* (2013.01); *G09F 13/005* (2013.01)

(58) Field of Classification Search
None
See application file for complete search history.

(56) References Cited

U.S. PATENT DOCUMENTS

| | | | | |
|---|---|---|---|---|
| 8,768,565 | B2* | 7/2014 | Jefferies | G07C 5/0808 |
| | | | | 701/32.7 |
| 10,060,175 | B1* | 8/2018 | Lickfelt | E05F 15/73 |
| 10,771,920 | B2* | 9/2020 | Pandit | G08B 27/001 |
| 11,494,496 | B2* | 11/2022 | Grosse | G06F 21/577 |
| 2016/0247327 | A1* | 8/2016 | Kozawa | G06Q 30/0645 |
| 2018/0359609 | A1* | 12/2018 | Bonanno | H04W 4/029 |
| 2020/0107159 | A1* | 4/2020 | Pandit | G06Q 50/265 |
| 2021/0303695 | A1* | 9/2021 | Grosse | G06N 3/08 |
| 2023/0303123 | A1* | 9/2023 | Sadek | B60W 60/0027 |
| 2024/0055099 | A1* | 2/2024 | Greenberg | A61B 5/4833 |
| 2024/0338946 | A1* | 10/2024 | Khan | G06V 10/26 |
| 2024/0418528 | A1* | 12/2024 | Chopra | G01C 21/3453 |

FOREIGN PATENT DOCUMENTS

JP 2015064719 A * 4/2015 ......... G01C 21/3407

OTHER PUBLICATIONS

Zubairi et al., Smart City Traffic Management for Reducing Congestion, 2022, IEEE, 978-1-6654-6197-9/22/$31.00, pp. 225-230 (Year: 2022).*

* cited by examiner

*Primary Examiner* — Carlos Garcia
(74) *Attorney, Agent, or Firm* — Banner & Witcoff, Ltd.

(57) ABSTRACT

A method of managing user movement in an area is provided. The area comprises a plurality of points of interest and/or zones. The method comprises receiving raw data relating to one or more users in the area and indicative of a geographic location of the one or more users. The method further comprises deriving, using the raw data relating to the one or more users, characterising data relating to one or more derived characteristics of the one or more users. The method further comprises forecasting, using a trained artificial intelligence model and the characterising data of the one or more users, user attendance at one or more of the points of interest and/or zones, and/or a number of users leaving the area, within a predetermined period. The method further comprises responding to the forecasted user attendance.

16 Claims, 2 Drawing Sheets

METHOD OF MANAGING USER MOVEMENT IN AN AREA

FIELD

The present disclosure relates to managing user movement in an area, such as an amusement park, ski resort, museum, conference facility, and the like. In particular, the disclosure relates to forecasting user attendance at one or more points of interest and/or zones within the area using a trained artificial intelligence model and responding to the forecasted user attendance to manage user movement.

BACKGROUND

Large venues and resorts may gather data about users/guests within a defined area. This data may be used to assist the users with planning their itinerary. For example, some venues may provide an application for navigating around the venue area (e.g., how to get around a ski resort). A venue may also gather other data about the users via different means. For example, the venue may be aware when guests make purchases at locations within the area. However, existing applications use their data in a very limited way and generally only use the data within that same application.

In limited circumstances, the data may be combined. For example, the venue may display data relating to financial transactions and location data via an online platform/dashboard, which may be accessed by management/security staff. Moreover, the venue may perform offline analysis of the data to identify trends, which may be used for future development. However, the data is generally not aggregated/rationalised, and it is difficult to draw meaningful conclusions from the data. Moreover, the data is not used proactively to manage the venue in real-time.

SUMMARY

A method of managing user movement in an area is provided. The area comprises a plurality of points of interest (e.g., rides, shows, restaurants, etc.) and/or zones (e.g., relative polygonal or otherwise defined quadrants). The method comprises receiving raw data relating to one or more users in the area and indicative of a geographic location of the one or more users. The method further comprises deriving, using the raw data relating to the one or more users, characterising data relating to one or more derived characteristics of the one or more users. The method further comprises forecasting, using a trained artificial intelligence model and the characterising data of the one or more users, user attendance at one or more of the points of interest and/or zones, and/or a number of users leaving the area, within a predetermined period (e.g., the next 60, 30, 10, or 5 minutes). The method further comprises responding to the forecasted user attendance.

The raw data may comprise one or more of:
geographic location data from electronic devices carried by the one or more users (e.g., from a native app and/or a web app),
signals from electronic gates indicating one or more of:
  entry of the one or more users to a point of interest
  exit of the one or more users from a point of interest
  entry of the one or more users to a zone;
  exit of the one or more users from a zone;
  entry of the one or more users to the area; and
  exit of the one or more users from the area,
signals from one or more wireless beacons detecting electronic devices carried by the one or more users (e.g., a Bluetooth Low-Energy "BLE" Beacon),
signals from one or more interactive elements in the area (e.g., electronic kiosks and/or self-service terminals), indicating interaction with the one or more users,
reservation data indicating one or more points of interest the one or more users intend to visit at predetermined times and/or check-in data indicating that the one or more users have attended reservations or attended a point of interest without a reservation,
data from one or more sales terminals indicating one or more financial transactions involving the one or more users,
data (e.g., visual data, thermal data) from one or more imaging systems (e.g., surveillance camera plus recognition system, ride photo system, numberplate recognition system, thermal imaging system, radar system) in the area indicating a location and/or direction or travel of the one or more users (e.g., by identifying a vehicle associated with the user) and/or indicating a number of users in a particular location (how crowded the area is), and
feedback from the one or more users.

The data from the one or more sales terminals may indicate where the user is. The data may further indicate what the user is buying. Users may be likely to stay in the same location for a while if buying refreshments.

The data from one or more sales terminals may link a financial transaction to a user based on one or more of: a credit/debit card used to pay for the transaction; a loyalty card used in conjunction with the transaction; a discount voucher tied to a guest identifier and used for the transaction; and any other guest identifier supplied during the transaction (e.g., a lodge number).

Feedback from one or more users may comprise one or more of: an indication of where the user has just been (a recently visited POI), what they thought of the recently visited POI, and how are they feeling now.

Responding to the forecasted user attendance may comprise one or more of:
adjusting electronic signage within the area to guide users away from points of interest and/or zones that are forecasted to exceed a threshold proportion of their capacity and towards other points of interest and/or zones (e.g., zones that are not forecasted to exceed the threshold proportion of their capacity),
adjusting navigation guidance provided to the one or more users via the electronic devices carried by the one or more users to guide the one or more users away from points of interest and/or zones that are forecasted to exceed a threshold proportion of their capacity and towards other points of interest and/or zones, and
adjusting a capacity of a point of interest (e.g., by changing staffing levels, adding carriages or trains, adding more shuttle busses, ordering the user a taxi, adjusting environmental systems such as lighting and/or air conditioning systems, automatically adjusting a physical queue size, and the like).

The electronic signage and/or navigation guidance may be adjusted in order to balance user traffic via different routes through the area. These may also be used to engage with guests to enhance user experience.

Navigation guidance may be used to redirect users to particular locations based on a determination of a next most likely purchase. For example, if the user is hungry, send them to their next destination via a route that passes a food outlet.

Responding to the forecasted user attendance may comprise adjusting lighting, sounds, and visual effects in certain areas of the park. These may be used to entice guests to particular locations. This may also be used to interact with guests to enhance user experience.

The raw data may indicate a physical location of the users or may characterise the users in some way. The deriving step extracts this information from the raw data.

The process of deriving characterising data from the raw data may be referred to as "feature engineering" and may be used to determine characteristics of the user, such as current speed, skiing ability, mood, and the like.

The derived characteristics may be presented to the AI model and may be used to predict guest behaviour with more accuracy than if the raw data were provided directly to the AI model.

Responding to the forecasted user attendance may comprise actively managing user movement within the area.

An area may be a venue or facility, such as an amusement park, ski resort, museum, conference facility, and the like. Alternatively, the area may be a city or transport network.

Forecasting user attendance at the points of interest/zones/leaving may comprise one or more of:
  determining a next most likely visited point of interest/
    zone (including determining a next ride/attraction the
    user is likely to queue for); and
  determining a likeliness of the user to dwell/pause.

Forecasting user attendance at the points of interest/zones/leaving may further comprise one or more of:
  forecasting future crowding/congestion for one or more
    points of interest/zones,
  forecasting future visitation/sales/purchases of the user,
  determining a likeliness of the user to return tomorrow (or
    in the future),
  determining an ideal chain of activities (itinerary), and
  identifying a best upsell/cross sell.

The electronic devices carried by the one or more users may be a user's mobile phone or may be a wearable device, such as a device issued by the venue.

The signals from electronic gates may arise when the user scans to identify themselves in order to enter/exit (e.g., at a turnstile). The user may scan a unique identifier, which could be a biometric identifier, a printed ticket identifier or could be an electronic device.

Imaging systems may include human identifying systems including thermal, radar and other mechanisms to infer a presence of individual guests or estimate a quantity of guests in an area.

The raw data relating to one or more users in the area may be referred to as "raw guest data".

Forecasting user attendance at one or more of the points of interest and/or zones, and/or a number of users leaving the area, within a predetermined period may comprise determining a likelihood of each of the one or more users attending each of the one or more points of interest and/or zones, and/or leaving the area within the predetermined period.

The method may further comprise testing a plurality of candidate derived characteristics by assessing an impact of each derived characteristic on the likelihood of the respective user attending each of the one or more points of interest and/or zones, and/or leaving the area. The method may further comprise ranking the plurality of candidate derived characteristics based on the assessed ability of each derived characteristic to impact the likelihood. The method may further comprise selecting a subset of the plurality of candidate derived characteristics for providing to the trained artificial intelligence model (e.g., a subset that have the greatest impact).

In other words, the "one or more derived characteristics of the one or more users" to which the characterising data relates may be the selected subset of the plurality of candidate derived characteristics.

The method may further comprise notifying one or more users of relevant live information. The information may be determined to be relevant based on the likelihood of the user attending each of the one or more points of interest and/or zones, and/or leaving the area within the predetermined period.

In some examples, the users may be notified of traffic conditions, public transport conditions/times, changes to performance times of various venues, wait times of points of interest, and the like.

In some examples, the guest management system may be integrated with external systems, such as transportation systems, via external APIs. Information via these external systems may be provided to users when it is deemed relevant to the user, based on the trained model.

The method may further comprise showing a custom screen/image/message to one or more users (e.g., via a display board or via an app on a user electronic device) based on customer needs determined via the trained model. In this way, the method may further enhance guest experience by anticipating their needs and responding accordingly.

In some examples, information may be displayed to users to encourage them to change their behaviour (or behaviour that has been predicted by the trained model). For example, if the trained model predicts that the user is likely to leave the park soon, the user may be encouraged to remain in the park longer by highlighting a big in-park event that is just longer than the estimated time left in the park.

The method may further comprise engaging with guests about their upcoming activity, based on the forecast data from the trained model. For example, if the model indicates the guest is hungry, the user could be directed to somewhere selling food (e.g., by offering them a discount on a particular product available at a nearby location). In this way, guest experience may be enhanced by anticipating and fulfilling the guests needs.

If the likelihood of the user attending a specific point of interest is above a threshold, they may be notified of live information relevant to that point of interest. This may be used to control the flow of users around the area. For example, if a user is forecasted to be about to leave, but the traffic conditions are currently worse than average, the user may be encouraged to postpone their departure until the traffic conditions alleviate. In another example, if a user is forecasted to attend a particular POI, which is currently over capacity (or has a long waiting time), the user could be encouraged to attend a different POI, which is currently under capacity (or has a shorter waiting time). In this way, the user may have a better experience, and the park resources may be utilised more efficiently.

The method may further comprise testing a plurality of candidate artificial intelligence models using test data comprising test characterising data and corresponding test user attendance data. The method may further comprise selecting an artificial intelligence model from the plurality of candidate artificial intelligence models that best forecasts the test user attendance data based on the test characterising data.

The plurality of artificial intelligence models may comprise one or more of the following types of models:
  logistic regression,
  neural network,
  recurrent neural network (RNN),
  long short-term memory (LSTM),
  convolutional neural network (CNN),
  k-means,
  support vector machine,
  k-nearest neighbours,
  random forest,
  decision tree,
  XGBoost (extreme Gradient Boosting), and
  large language model.

The plurality of artificial intelligence models may comprise a plurality of models of the same type and having different values of one or more hyperparameters.

The hyperparameters may comprise one or more of:
  More creative, less creative,
  Long answer short answer,
  Gamma, and
  Tree method.

For some examples (e.g., Logistic Regression models), the hyperparameters may comprise one or more of:
  Penalty,
  Regularization strength,
  Solver algorithm,
  Maximum number of iterations,
  Class weight,
  Multi-Class handling,
  Dual or primal formulation,
  Tolerance, and
  Random state.

For some examples (e.g., Neural Network), the hyperparameters may comprise one or more of:
  Learning rate,
  Batch size,
  Epochs,
  number of hidden layers,
  neurons per layer,
  Regularization,
  Dropout rate,
  Activation functions,
  Weight initialization,
  Optimizer, and
  Loss function.

For some examples (e.g., Recurrent Neural Network, RNN, and Long Short-Term Memory, LSTM), the hyperparameters may comprise one or more of:
  Number of layers,
  Sequence length, and
  Gradient clipping.

For some examples (e.g., Convolutional Neural Network, CNN), the hyperparameters may comprise one or more of:
  Number of convolutional layers,
  Number of filters,
  Kernel size,
  Strides,
  Padding, and
  Pooling.

For some examples (e.g., K-means), the hyperparameters may comprise one or more of:
  Number of clusters,
  Initialization method,
  Number of initializations,
  Maximum number of iterations,
  Convergence tolerance,
  Random seed, and
  Algorithm type.

For some examples (e.g., Support Vector Machine, SVM), the hyperparameters may comprise one or more of:
  Kernel type (e.g., linear, polynomial, radial basis function, RBF),
  Regularization parameter,
  Kernel coefficient (gamma),
  Degree,
  Class weights,
  Tolerance,
  Kernel cache size,
  Shrinking, and
  Cross-validation.

For some examples (e.g., K-Nearest Neighbours, KNN), the hyperparameters may comprise one or more of:
  Number of neighbours,
  Distance metric,
  Weights,
  Algorithm,
  Leaf size,
  Parallelization,
  Power parameter for the Minkowski metric, and
  Cross-validation.

For some examples (e.g., Random Forest), the hyperparameters may comprise one or more of:
  Number of trees,
  Maximum depth of tree,
  Minimum number of samples per leaf,
  Quality of a split,
  Minimum number of samples per split,
  Maximum features,
  Bootstrap samples,
  The randomness of the bootstrapping of the samples, and
  Out-of-bag samples.

For some examples (e.g., Decision Tree), the hyperparameters may comprise one or more of:
  Criterion,
  Maximum depth,
  Minimum samples per split,
  Minimum samples per leaf,
  Maximum number of features,
  Random state, and
  Class weight.

For some examples (e.g., XGBoost), the hyperparameters may comprise one or more of:
  Number of trees,
  Learning rate,
  Minimum loss reduction (Gamma),
  Fraction of samples,
  Max tree depth,
  Minimum child weight,
  Regularisation parameters,
  Random seed,
  Objective function, and
  Balance of positive and negative weights.

For some examples (e.g., large language model), the hyperparameters may comprise one or more of:
  Model Size,
  Number of Epochs,
  Learning Rate,
  Batch Size,
  Max Output Tokens,
  Decoding Type,
  Top-k and Top-p Sampling,
  Temperature,
  Stop Sequences, and Frequency and Presence Penalties.

Hyperparameter tuning may be performed by one or more of the following methods:

Random Search,

Grid Search, and

Bayesian Optimisation.

Forecasting user attendance using a trained artificial intelligence model may comprise forecasting a plurality of intermediate outcomes using a plurality of trained artificial intelligence models and combining the plurality of intermediate outcomes to obtain a likelihood of the user attending each of the one or more points of interest and/or zones, and/or leaving the area within the predetermined period.

The method may further comprise training the artificial intelligence model using historical attendance data (which may comprise data indicating attendance of specific users at the points of interest and leaving the venue) and historic characterising data of the one or more users.

The method may further comprise updating the artificial intelligence model using real-time attendance data and characterising data of the one or more users (e.g., via adaptive learning to adapt to new patterns in guest behaviour in real-time).

The method may further comprise defining a boundary (geofence) around the area (e.g., around a ski resort). A user may be defined as leaving the area if they travel outside the defined boundary. Alternatively, a user may exit through a defined point of exit, such as a turnstile.

The method may further comprise monitoring the defined boundary for users leaving the area (e.g., a "Geofence Breach System").

The raw data may comprise one or more of:

accommodation information relating to the one or more users (e.g., how many days the user is staying at the venue);

data relating to the one or more users retrieved from one or more external databases (such as social media platforms); and preference data associated with the one or more users;

environmental data (weather, etc).

The one or more derived characteristics may comprise one or more of:

user food and/or drink preferences (e.g. whether the user is a happy hour attendee), user mood (e.g., hunger, energy, excitement, positivity), proximity to a point of interest, and proximity to an exit of the area.

The method may further comprise adjusting environmental conditions in response to the forecast data.

The forecasted data may be integrated with operations & environmental management systems to handle predicted upcoming crowding in particular areas by:

adjusting environmental conditions (temperature, airflow, lighting, etc.);

opening/closing facilities and supplemental activities;

adjusting transportation systems adjustments.

In some examples, the method may comprise turning on air-conditioning in a particular zone if an influx of people is predicted.

In other examples, the method may comprise turning off the air conditioning to increase the temperature in a particular zone (or tuning off the heating to decrease the temperature in a particular zone) to discourage users from pausing/resting in certain areas).

The method may further comprise presenting the forecast data via a dashboard display interface. For example, the forecast data may be displayed to venue operators to allow them to manage the venue more effectively. The data displayed via the display interface may further comprise real-time analytics and system status.

The method may further comprise notifying an operations team in response to the forecast data. For example, if more staff are needed in a certain area to deal with a sudden increase in people, a notification may be sent to venue management.

The proposed methods may be used to facilitate staff tooling, in which facility staff resources are managed to respond to the forecast data (e.g., to act on many guests' intentions). In some examples, staff may be moved to where guests will be soon. In other examples, staff may be alerted of upcoming crowding/guest action. In further examples, staffing schedules may be adjusted to accommodate future guest activity.

The method may further comprise presenting a tailored offer to a user, based on the forecast data. For example, a user may be presented with a promotional offer or discount on a product/service, based on guest's next predicted activity.

In particular, a user may be presented with a promotional offer or discount to encourage a purchase that is not their predicted next purchase. For example, if the user is predicted to attend a POI that is over crowder. They may be offered a discount at a less crowded POI. This may improve user experience and may improve overall utilisation of POIs in the area, thus leading to improved overall efficiency.

Other promotional offers/discounts that may be offered may include one or more of:

queuing one-shots (an opportunity to join a fast-track queue), in-park food and beverages, merchandise (e.g., souvenirs, photographs), a return ticket for another date/time, and pass or membership.

A management system (e.g., a venue management system) configured to perform any of the methods described above is also provided.

A computer program comprising instructions that, when executed on a processor, cause the processor to perform any of the methods described above is also provided.

The following paragraphs (M1) through (M14) describe examples of methods that may be implemented in accordance with the present disclosure.

(M1) A method of managing user movement in an area, wherein the area comprises a plurality of points of interest and/or zones, the method comprising: receiving raw data relating to one or more users in the area and indicative of a geographic location of the one or more users, wherein the raw data comprises one or more of: geographic location data from electronic devices carried by the one or more users, signals from electronic gates indicating one or more of: entry of the one or more users to a point of interest; exit of the one or more users from a point of interest; entry of the one or more users to a zone; exit of the one or more users from a zone; entry of the one or more users to the area; and exit of the one or more users from the area, signals from one or more wireless beacons detecting electronic devices carried by the one or more users, signals from one or more interactive elements in the area, indicating interaction with the one or more users, reservation data indicating one or more points of interest the one or more users intend to visit at predetermined times and/or check-in data indicating that the one or more users have attended reservations or attended a point of interest without a reservation, data from one or more sales terminals indicating one or more financial transactions involving the one or more users, data from one or more imaging systems in the area indicating a location and/or direction or travel of the one or more users and/or indicating a number of users in a particular location, and feedback from the one or more users, deriving, using the raw data relating to the one or more users, characterising data relating to one or more derived characteristics of the one or more users; forecasting, using a trained artificial intelligence model and the characterising data of the one or more users, user attendance at one or more of the points of interest and/or zones, and/or a number of users leaving the area, within a predetermined period; responding to the forecasted user attendance by one or more of: adjusting electronic signage within the area to guide users away from points of interest and/or zones that are forecasted to exceed a threshold proportion of their capacity and towards other points of interest and/or zones, adjusting navigation guidance provided to the one or more users via the electronic devices carried by the one or more users to guide the one or more users away from points of interest and/or zones that are forecasted to exceed a threshold proportion of their capacity and towards other points of interest and/or zones, and adjusting a capacity of a point of interest.

(M2) A method may be performed as described in paragraph (M1) wherein forecasting user attendance at one or more of the points of interest and/or zones, and/or a number of users leaving the area, within a predetermined period comprises determining a likelihood of each of the one or more users attending each of the one or more points of interest and/or zones, and/or leaving the area within the predetermined period.

(M3) A method may be performed as described in paragraph (M2) further comprising: testing a plurality of candidate derived characteristics by assessing an impact of each derived characteristic on the likelihood of the respective user attending each of the one or more points of interest and/or zones, and/or leaving the area, ranking the plurality of candidate derived characteristics based on the assessed ability of each derived characteristic to impact the likelihood, selecting a subset of the plurality of candidate derived characteristics for providing to the trained artificial intelligence model.

(M4) A method may be performed as described in any of paragraphs (M2) or (M3) further comprising: notifying one or more users of relevant live information, wherein the information is determined to be relevant based on the likelihood of the user attending each of the one or more points of interest and/or zones, and/or leaving the area within the predetermined period.

(M5) A method may be performed as described in any of paragraphs (M1) through (M4) further comprising: testing a plurality of candidate artificial intelligence models using test data comprising test characterising data and corresponding test user attendance data; selecting an artificial intelligence model from the plurality of candidate artificial intelligence models that best forecasts the test user attendance data based on the test characterising data.

(M6) A method may be performed as described in paragraph (M5), wherein the plurality of artificial intelligence models comprises one or more of the following types of models: logistic regression, neural network, recurrent neural network, long short-term memory, convolutional neural network, k-means, support vector machine, k-nearest neighbours, random forest, decision tree, XGBoost, and large language model.

(M7) A method may be performed as described in any of paragraphs (M5) or (M6), wherein the plurality of artificial intelligence models comprises a plurality of models of the same type and having different values of one or more of the following hyperparameters: creativity, answer length, gamma, tree method, penalty, regularization strength, solver algorithm, maximum number of iterations, class weight, multi-class handling, dual or primal formulation, tolerance, random state, learning rate, batch size, number of epochs, number of hidden layers, neurons per layer, regularization, dropout rate, activation functions, weight initialization, optimizer, loss function, number of layers, sequence length, gradient clipping, number of convolutional layers, number of filters, kernel size, strides, padding, pooling, number of clusters, initialization method, number of initializations, maximum number of iterations, convergence tolerance, random seed, algorithm type, kernel type, regularization parameter, kernel coefficient, degree, class weights, tolerance, kernel cache size, shrinking, cross-validation, number of neighbours, distance metric, weights, algorithm, leaf size, parallelization, power parameter for the Minkowski metric, cross-validation, number of trees, maximum depth of tree, minimum number of samples per leaf, quality of a split, minimum number of samples per split, maximum features, bootstrap samples, the randomness of the bootstrapping of the samples, out-of-bag samples, criterion, maximum depth, minimum samples per split, minimum samples per leaf, maximum number of features, random state, class weight, learning rate, minimum loss reduction, fraction of samples, minimum child weight, regularisation parameters, random seed, objective function, balance of positive and negative weights, model size, max output tokens, decoding type, top-k and top-p sampling, temperature, stop sequences, and frequency and presence penalties.

(M8) A method may be performed as described in any of paragraphs (M1) through (M7) wherein forecasting user attendance using a trained artificial intelligence model comprises forecasting a plurality of intermediate outcomes using a plurality of trained artificial intelligence models and combining the plurality of intermediate outcomes to obtain a likelihood of the user attending each of the one or more points of interest and/or zones, and/or leaving the area within the predetermined period.

(M9) A method may be performed as described in any of paragraphs (M1) through (M8) further comprising training the artificial intelligence model using historical attendance data and historic characterising data of the one or more users.

(M10) A method may be performed as described in any of paragraphs (M1) through (M9) further comprising updating the artificial intelligence model using real-time attendance data and characterising data of the one or more users.

(M11) A method may be performed as described in any of paragraphs (M1) through (M10) further comprising: defining a boundary around the area, wherein a user is defined as leaving the area if they travel outside the defined boundary.

(M12) A method may be performed as described in any of paragraphs (M1) through (M11) wherein the raw data further comprises one or more of: accommodation information relating to the one or more users, data relating to the one or more users retrieved from one or more external databases, preference data associated with the one or more users, and environmental data.

(M13) A method may be performed as described in any of paragraphs (M1) through (M12) wherein the one or more derived characteristics comprise one or more of: user food and/or drink preferences, user mood, proximity to a point of interest, and proximity to an exit of the area.

(M14) A method may be performed as described in any of paragraphs (M1) through (M13) further comprising one or more of: adjusting environmental conditions in response to the forecast data; presenting the forecast data via a dashboard display interface; and presenting a tailored offer to a user, based on the forecast data.

The following paragraph (A1) describes an example apparatus that may be implemented in accordance with the present disclosure.

(A1) A management system may configured to perform the method described in any of paragraphs (M1) through (M14).

The following paragraph describes an example of computer-readable media or computer program that may be implemented in accordance with the present disclosure.

(CRM1) A computer program or computer-readable media may comprise instructions that, when executed on a processor, cause the processor to perform the method described in any of paragraphs (M1) through (M14).

DETAILED DESCRIPTION

Figure 1:
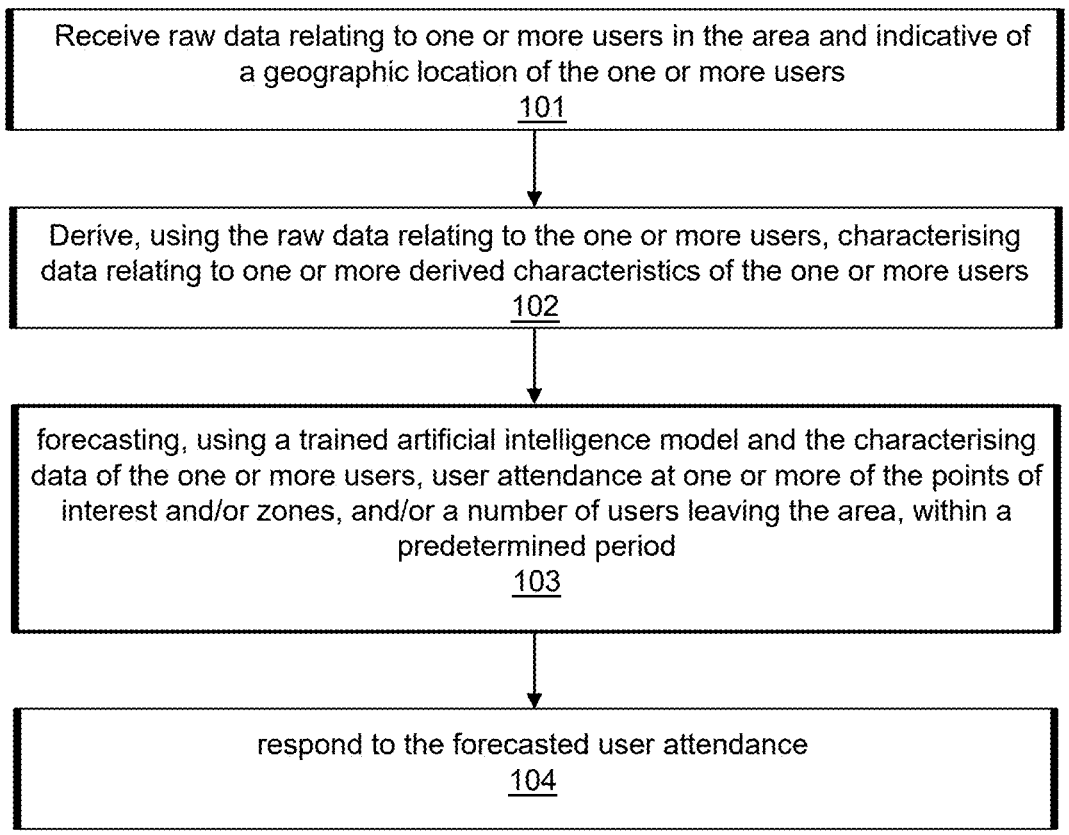
FIG. 1 illustrates a flowchart of a method according to some examples described herein.

The present disclosure provides a system for predicting guest movement. As described above, data gathered by venues and resorts may be used for a number of purposes. This may be used to assist with planning user itinerary, navigating around the venue area, may be provided to management/security staff, or may be analysed offline to identify trends.

In prior art systems, the data is generally not aggregated/rationalised, and it is difficult to draw meaningful conclusions from the data. Moreover, the data is not used proactively to manage the venue in real-time. The present disclosure therefore aims to share user location data and other user-pertinent data (such as data relating to financial transactions) from different applications, with a centralised management system.

The management system collects data from multiple sources (e.g., different applications) and processes the data to forecast what the user(s) are likely to do in the future. The management system uses a trained AI model to identify patterns that indicate what the user is intending to do. The management system then acts on the forecast data to manage user movement within the area.

In one or more example, the system may be used to determine how much longer a user will be staying within the park/venue/resort/area. This may be used to present relevant information to the user.

In some specific examples, the management system may identify trends that may be used to manage staffing/capacity of rides in a theme park. For example, the system may determine that users are more likely to attend thrill rides in the morning and casual rides in the evening and may plan staffing levels and ride capacity accordingly.

In other specific example, the system may use real-time forecast data (e.g., aggregated data relating to many users) and use this data to control physical systems. For example, if the system forecasts an increase in guests attending a particular attraction soon, the system may prepare the attraction with increased staffing or increased capacity on the attraction (e.g., by adding an additional train to a ride).

Likewise, if a transport route within the venue is predicted to become busier soon, the system may increase capacity on that transport route. For example, the system may schedule additional trains or busses.

Moreover, the system may act on the forecast data to manage the environment within the area. For example, the system may turn on the air conditioning in anticipation of many guests queuing in a particular area.

The system may adjust digital signage in anticipation of user movement, to be helpful and assist the user getting where they are likely to want to go. Alternatively, the system may adjust digital signage to attempt to change guest behaviour. For example, if the forecast data indicates that a particular point of interest is likely to become crowder, the system may adjust digital signage to encourage users to attend different points of interest. This may reduce overcrowding on the particular point of interest (e.g., for safety reasons) and more effectively utilise available capacity on the other points of interest.

Moreover, if the forecast data indicates that a user is likely to leave soon, the system may help that user to leave the area in an efficient manner (e.g., by providing navigation guidance) or may try to make the user stay longer (e.g., by advertising shorter than average waiting times on an attraction that may be of interest to the user or by offering the user a discount on refreshments).

In order to provide the forecast data, one or more illustrative aspects described herein provide a trained AI model that is used to predict guest movement.

In a specific example, a guest management system for a ski resort is provided. The guest management system collects data from one or more users in the resort. The dataset collected for analysis may comprise a set of timestamp,
user ID,
latitude, and
longitude.

The guest management system may be integrated with other systems to improve efficiency around the area. For example, the system may be integrated with lift gates to identify actual entry or exit from the area. The system may be integrated with a reservation system that stores stay info, so the guest management system has access to more data about the user (e.g., how many days they are staying in the area).

The proposed system may also be applied to theme parks and water parks. Guest information may be collected from a number of sources and fed into the guest management system to more accurately forecast guest movement. For example, data may be obtained from electronic devices carried by the users. Data may be obtained from electronic wristbands or modules issued by the park, which may identify the user at turnstiles and fixed information points and may allow the user to join virtual queueing systems.

Data may be obtained from applications running on mobile devices carried by the users (e.g., an application for navigating around the park and/or for joining virtual queues within the park). The mobile devices may provide geographic location information to the guest management system from a satellite navigation system or based on mobile network signal data.

Other inputs to the guest management system may be obtained from sensors within the park, such as surveillance systems (e.g., cameras), communications systems (e.g., wireless LAN or cellular network nodes), and the like.

As described above, location data may be derived from a mobile device (e.g., mobile phone) of the one or more users in the area. This location data may be provided from a native application on the mobile device, from a web application (e.g., a ticketing application), from a background application, from a mapping/navigation application, via geofence breach system monitoring, via digital wallet monitored proximity, from a queuing or entry system and/or from BLE Beacon interaction.

Additional guest information may be provided directly by the guest in the form of guest preferences and/or guest feedback. The system may also obtain information relating to guest purchases and/or entitlements.

Further data may be obtained via Guest Interaction within the area. Data obtained via guest interaction may relate to guest location as well as activity insights. Data may be obtained from electronic gates within the area (e.g., to access particular zones or POIs) and ID tied access (e.g., using an access card to open a door).

Data may also be obtained from point-of-sale devices (merchant checkouts). This data may arise based on the use of a discount code that is linked to a particular user, a loyalty card linked to a particular user and/or a charge card (e.g., credit/debit card or gift card) linked to a particular user. The user ID may be obtained by use of an RFID or other access media at the POS device.

Data may also be obtained from ride reservations made by the one or more users in the area. These reservations may relate to one or more virtual queuing systems. The data may arise as a result of creation of the reservation, check-in to the reservation and/or navigation of the user to the reservation via an application.

Likewise, data may also be obtained from other types of reservations, such as shows/events reserved and/or attended. Even for events that are free to access, the user may nevertheless require a reservation and may be provided with a dated/timed ticket.

Data may also be obtained from user engagement with interactive elements and/or electronic kiosks in the area. In order to interact, the user may be required to identify themselves, with an ID-tied element. This can provide a geographic location of the user, as well as other information based on the interaction.

Data may also be obtained from other guest-tied park systems such as ride photos and security camera footage. AI may be used to identify guests in this data and timestamp/geolocation data may be provided to the guest management system. Similarly, a car license plate recognition system and/or car park transaction data may be used to identify vehicles. This can be used to determine data relating to users linked to the vehicles.

Data may also be obtained from guest wearable devices (and AR devices). For example, wireless Interaction of wearable devices with features within the area may be used to determine device location (and therefore user location).

Device proximity and in-park sensing may also be used to passively identify user devices.

Additional data may also be obtained from Non-Guest-Specific Park Systems. Fr example, Environmental data (e.g., weather, etc.) may be provided to the trained AI model.

Likewise, surveillance cameras may be used for People counting/sensing, which can provide an indication of crowdedness of zones within the park. Anonymous user feedback (e.g., positive, negative) may also be provided to the model.

The management system may collect the raw data from the various data sources, including real-time guest interactions and venue-specific information. The management system may be configured to collect data from diverse technical data inputs. The raw data may be combined together at the management system into a processable form. This may be performed automatically using data meshing software.

The management system may serve as a central hub for data collection, processing, and interaction with guest applications. The management system may be a highly specialized platform designed to handle complex data operations.

The system may infer a number of other metrics from the raw data (e.g., 50 to 60 derived characteristics). For example, where the raw data is latitude, longitude, identifier, timestamp, the system may calculate the current speed of the user, momentum, a direction of travel, a proximity to each of a number of specific points of interest, a proximity to an exit, and the like. These other metrics may be derived characteristics of the user that are more useful for forecasting guest movement than the raw data. The processed data that supplies the derived characteristics of each of the one or more users is referred to as "characterising data".

In this way, the proposed methods may use innovative data processing techniques to transform raw data into more meaningful features for model training and forecasting.

In some examples relating to a ski resort, an ability level of a skier may be inferred based on the average speed of the user (faster skiers are more competent). This ability may in turn be used to predict when a user will leave the venue (more competent skiers tend to stay for less time). A rate of turns may also be an indicator of ability and may therefore be a driver for when a user will leave. This demonstrates how feature engineering may be used to derive characteristics that are good drivers for predicting guest behaviour.

Other derived guest identity characteristics may be determined from the raw data in a number of ways. The guest identity characteristics may be determined based on a rules engine (e.g. if the guest is a happy hour attendee then the guest drinks alcohol). Guest identity characteristics may be further determined based on guest preferences and/or guest feedback provided directly by the guest (e.g., if guest is subscribed to news relating to rollercoasters then they are interested in thrill rides). Guest identity characteristics may be further determined based on guest purchases/entitlements (e.g., if guest has purchased a beef burger they are not a vegetarian).

A boundary may be defined around the ski resort (a "geofence"). The derived characteristics may further comprise a proximity to the boundary.

The derived characteristics may be more useful as inputs to the model (for training and forecasting) than the raw data. The process of generating derived characteristics that are more useful that the raw data may be referred to as "feature engineering".

Historical batches of data (including raw data characterising data) may be collected and stored. The past data may be retrieved and used for training and refining predictive models.

Using the characterising data (which provides the Individual user data relating to the derived characteristics), a trained AI model may be used to forecast the likelihood of a guest attending a particular POI or zone within the resort, or leaving the resort, within a predetermined time period (e.g., the next 60, 30, 10, 5 minutes).

The trained AI model may be hosted in a cloud environment provided by a web services provider, such as Amazon Sagemaker (RTM). The trained AI model may be deployed and maintained according to MLOps (Machine Learning Operations) practices. The skilled person is familiar with implementation of known AI models in this manner.

AI models may be trained in the cloud environment using historic data. Live data may be queried against the AI models to provide the outputs. For example, data from a partial day may be obtained from the user and provided to the model to obtain a deterministic output forecasting the user's future activity.

The output may comprise a confidence percentage.

The AI models may provide real-time predictions by querying the trained AI models as guests interact with the system. The trained AI models therefore enable real-time data processing and response.

Querying of the AI model may be automated based on specific events or triggers (such as the end of a high-capacity performance, which may result in increased movement of users within the area). This may improve the efficiency of the management system by responding to specific events, rather than running periodically.

In a pre-training assessment, the characterising data may be assessed using machine learning to determine the relevance of each of the different derived characteristics to the goal function (how relevant the features are to the output of the model). In other words, prior to training the model, the system may study each of the features' abilities to impact the output.

Based on the pre-assessment, the features (derived characteristics) may be ranked according to their relative impact. The ranking may be provided to the AI model.

The AI model may have a number of hyperparameters that may be tuned to improve the output of the AI model. The hyperparameters of the model will depend on the model type and may include one or more of:
  more creative, less creative;
  long answer short answer;
  learning rate;
  minimum loss reduction (gamma);
  fraction of samples;
  number of trees;
  tree method;
  max tree depth;
  minimum child weight;
  regularisation parameters;
  random seed;
  objective function; and
  balance of positive and negative weights.

A process of hyperparameter tuning may be used to adjust these hyperparameters.

Tuning the hyperparameters adjusts how the model answers the questions. For example, the hyperparameters may control how varied the possible answers considered by the model are and/or how deep down a decision tree the model should explore before backing out.

The system may analyse the inputs, sample them and determine how to train the model using the hyperparameters to adjust the model.

Instead of running one single model, the system may generate 200 separate models with slightly varied hyperparameter features. These models may each be used to answer the questions and the results may be compared to determine the best model/hyperparameters.

The model may work best when it is configured to meet a simple objective. For example, the model may be used to answer a question as a "yes" or "no", based on likelihood. In another example, rather than attempting to predict an exact location that the user may be travelling to (which may be difficult to predict) the model may attempt to predict where the user would most likely go if they were going to buy a burger.

The model may be used to answer a large number (e.g., hundreds) of questions that may be combined to provide an end result/output.

In some examples, a complex question may be broken down into smaller, simpler questions. The answers to these simpler questions may be combined (e.g., using a rules engine) to answer the more complex questions. Advantageously, accuracy is not lost when combining (adding up) the answers in this way.

For example, the AI model may use multiple trained individual models, each of which is focused on a simple objective to answer a simple question, such as "is the user hungry?". If the answer is yes, the AI model may be more likely to predict that the user will go somewhere that serves food. Other questions addressed by other individual models may include "Is the user leaving the venue?", "Is the user going to be dwelling/starting a break soon?", "Does the user need to use a restroom?", "Is the user bored?", and the like. The AI model may use multiple trained models and join the outputs together to determine a user intent. For example, if the outputs are "user is hungry", "not dwelling", "not leaving", the model may predict the user will purchase food eaten on the go.

A rules-engine based formula may be used to combine the outputs from the individual models to provide the forecast data.

The trained AI model is used to process the characterising data of the users to forecast user attendance at the points of interest/zones and/or whether users are likely to leave the area, within a predetermined period. In other words, the trained AI models are used to predict guest behaviour.

The trained AI model may be used to make a number of other determinations about the user. The determinations may comprise one or more of:
  likeliness to be exiting;
  likeliness to visit point of interest (ride, show, attraction);
  next most likely visited point of interest;
  likeliness to dwell/pause;
  best upsell/cross sell;
  next ride/attraction likely to queue for;
  future crowding/congestion;
  future visitation/sales/purchases;
  likeliness to return tomorrow (or in the future);
  ideal chain of activities (itinerary); and
  emotion (such as hunger, energy, excitement, positivity).

The AI "model" may comprise a plurality of different models. Each model may provide a different output. The outputs from the different models may be combined (e.g., via a rule engine) to create further outputs. For example, a plurality of AI models may be used to predict the likelihood that a user will visit each individual POI. These likelihoods may be combined to provide the POI that the user is most likely to visit next. The next most likely POI of all the users may be combined to forecast how crowded each POI is likely to become (or what percentage of capacity the POIs will be operating at).

The forecast data may be compared to actual data collected in real time. The differences between the forecast data and the real data may be used to re-train the model and or adapt the model (e.g., by adjusting the hyperparameters).

In this way, the AI model may be regularly validated and re-trained. This may facilitate continuously updating the models with new data to maintain accuracy. This may provide ongoing technical improvements and adaptive learning capabilities.

To facilitate adaptive learning, specific adaptive learning algorithms may be used. These algorithms not only learn from historical data but also adapt to new patterns in guest behaviour in real-time.

The forecast data may be used to manage guest movement in a number of ways. The system may notify individual guests of relevant information, based on the forecast of their behaviour. For example, the system may notify a user of external traffic conditions if they are planning to leave or notify the user of congestion within the venue if they are planning to visit a congested zone imminently. Moreover, the system may provide guidance to multiple users simultaneously via dynamic signage (e.g., to send them to a destination via a less congested route). Moreover, the system may notify the operations team if they need more staff in a certain area to deal with a sudden increase in guests.

The system may also be used in a number of other ways. For example, the system may predict whether guests will stop at a certain location (e.g., a cafeteria), which may be used for traffic and staffing management. If there is more than one cafeteria or restaurant, the system may guide users to the less busy one. In other examples, the system may predict if users are less likely to stop at a POI (e.g., a shop or cafeteria) and may display a notification or send an offer to the user to encourage them to stop.

As used in this disclosure, "traffic" may refer to foot traffic, as well as vehicular traffic.

In a specific example, if the system is semi confident that the user is leaving and that the user is interested in alcohol, then send a happy hour offer to the user. In another example, if the system is 100% sure the guest is leaving and that the user arrived by taxi then the system may order them a taxi to collect them.

The forecast data output by the model may be used in a number of ways, as explained above. Navigation directions may be provided to the users to guide them to points of interest.

The navigation directions may be adjusted based on the forecast data to guide users to points of interest that have sufficient capacity, or via routes that are less congested to improve the flow of guest traffic around the area. For example, if a ski lift with a fixed throughput is currently experiencing delays, then the user may be sent via an alternative route to alleviate the congestion on that ski lift.

In some examples, users may be guided via a navigation application on a mobile device. In other examples, users may be guided via dynamic signage in the venue. Dynamic signage may be used to control the flow of users via different routes. For example, in a transport station (such as an underground metro train station), platforms may be accessible via different routes and signage may be dynamically adjusted to alleviate congestion, avoid hazards, implement one-way systems, respond to threats, and the like.

In yet further examples, capacity data may be provided to users in real-time (e.g., via dynamic displays or via electronic devises carried by the users). This may be especially useful in a theme park, where the users may prefer to go on a ride with a shorter wait.

In yet further examples, the guest management system may be configured to electronically close off certain routes to users or disallow entry to certain points of interest. This may allow the guest management system to directly control user movement within the venue.

The system may be further configured to set a number of additional outputs based on the forecast data. For example, the system may configure a dynamic pricing based on a guest's next activity (especially when attempting to sell a different product/service).

The system may be further configured to provide a custom guest experience, based on the forecast data. For example, in a mobile application connected to the system, the user may be provided with a custom screen/image/message based on customer needs in the guest experience. The forecast data may be used to highlight events that will occur while the user is predicted to remain in the park. Alternatively, events that are just after the user is predicted to leave the park may be highlighted, to encourage the user to stay.

In-park lighting, sounds, and visuals may be configured based on the forecast data, to enticing guests and improve guest interaction and overall experience.

Smart messaging may be addressed to the user in order to engage with guests about their upcoming activity. The messaging may be based on current emotions from the forecast data to enhance user experience.

The AI model may also identify persona of similar guests. These may be based on a sequence of events, similar preferences, purchases, activities, similar location trends or history, and the like. Similar guest persona may be used to more accurately forecast guest behaviour.

The system may be configured to adjust staffing levels based on the forecast data indicating many guests' intentions. For example, the system may move staff to where guests will be soon, alert staff of upcoming crowding/guest action, and/or adjust staffing schedule to accommodate future guest activity.

The system may adjust operations and environmental parameters based on the forecast data. For example, the system may adjust smart environment settings, such as temperature, airflow, lighting, etc., to handle the upcoming crowds. The system may also open/close facilities and supplemental activities in response to the forecast data and may adjust transportation systems to meet guest needs (e.g., by adding more shuttle busses if many users are predicted to leave soon).

The system may also provide AI Assistance/Robotics Interactions to converse with guests and engage with what the guest will need. The forecast data may be user by these systems to provide tailored assistance based on predicted guest needs.

Aspects of the proposed methods may be implemented in an edge network. By implementing edge computing to process data closer to the data source, latency and bandwidth usage may be reduced. This may improve system efficiency and responsiveness.

Advanced-Data Security Measures may be implemented to integrate encryption, anonymization, and secure data transmission protocols to protect guest data. This may address technical challenges related to data privacy and security.

Scalability solutions may be integrated. Cloud-based services or microservices architecture may be incorporated to enable horizontal scaling as guest numbers fluctuate. This may improve the ability of the system to handle varying loads and ensure system reliability.

The system may provide a real-time data analytics dashboard to provide venue operators with a dashboard displaying real-time analytics and system status. This may be used to enhance operational control and decision-making.

The system may be integrated with external systems. The system may interact with external APIs, such as transportation systems or social media platforms, for enriched data collection. This may provide enhanced technical interoperability and data integration capabilities.

FIG. 1 illustrates a flowchart of a method of managing user movement in an area according to some examples. The area comprises a plurality of points of interest and/or zones. The method comprises:
at step 101, receiving raw data relating to one or more users in the area and indicative of a geographic location of the one or more users;
at step 102, deriving, using the raw data relating to the one or more users, characterising data relating to one or more derived characteristics of the one or more users;
at step 103, forecasting, using a trained artificial intelligence model and the characterising data of the one or more users, user attendance at one or more of the points of interest and/or zones, and/or a number of users leaving the area, within a predetermined period; and
at step 104, responding to the forecasted user attendance.

The raw data comprises one or more of:
geographic location data from electronic devices carried by the one or more users (e.g., from a user device such as a mobile phone that can capture coordinates, such as via a satellite navigation system),
signals from electronic gates (e.g., a turnstile or point-of-sale access barrier) indicating one or more of:
entry of the one or more users to a point of interest;
exit of the one or more users from a point of interest;
entry of the one or more users to a zone;
exit of the one or more users from a zone;
entry of the one or more users to the area; and
exit of the one or more users from the area,
signals from one or more wireless beacons detecting electronic devices carried by the one or more users,
signals from one or more interactive elements in the area, indicating interaction with the one or more users,
reservation data indicating one or more points of interest the one or more users intend to visit at predetermined times and/or check-in data indicating that the one or more users have attended reservations or attended a point of interest without a reservation,
data from one or more sales terminals indicating one or more financial transactions involving the one or more users,
data from one or more imaging systems in the area indicating a location and/or direction or travel of the one or more users and/or indicating a number of users in a particular location, and
feedback from the one or more users.

Responding to the forecasted user attendance comprises one or more of:
adjusting electronic signage within the area to guide users away from points of interest and/or zones that are forecasted to exceed a threshold proportion of their capacity and towards other points of interest and/or zones,
adjusting navigation guidance provided to the one or more users via the electronic devices carried by the one or more users to guide the one or more users away from points of interest and/or zones that are forecasted to exceed a threshold proportion of their capacity and towards other points of interest and/or zones, and
adjusting a capacity of a point of interest.

Figure 2:
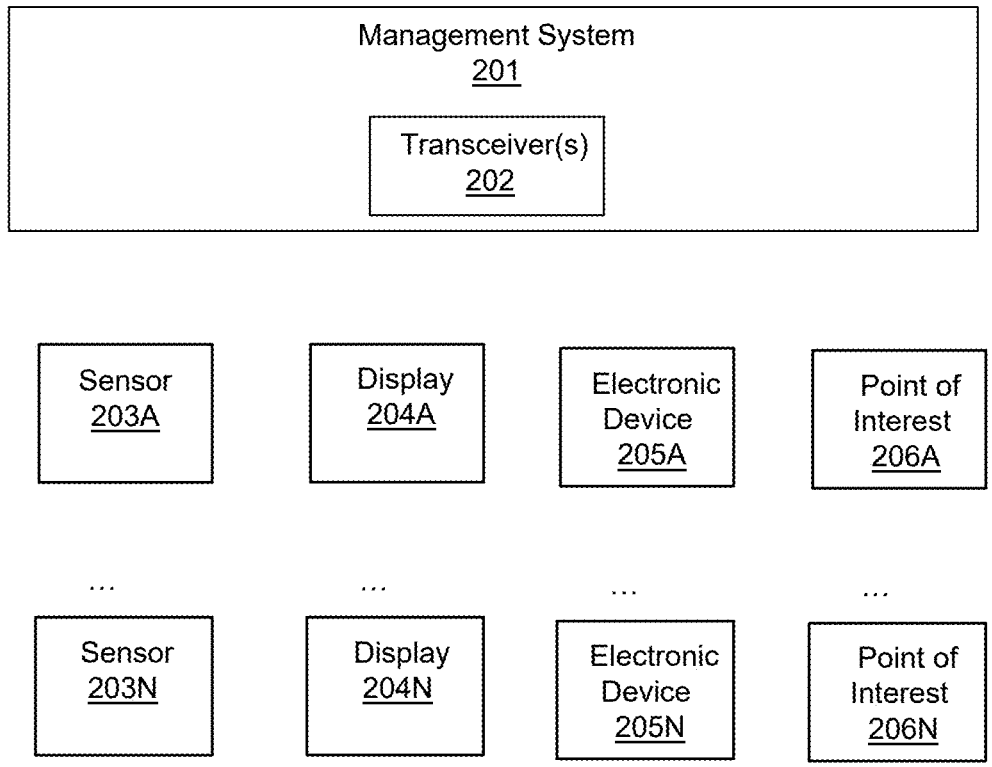
FIG. 2 illustrates a management system according to some examples described herein.

FIG. 2 illustrates a management system 201 for managing user movement in an area 200 according to some examples. The management system 201 comprises one or more transceivers 202 for:
receiving raw data from one or more sensors 203A-203N; and
responding to forecasted user attendance by adjusting electronic signage comprising one or more displays 204A-204N, adjusting navigation guidance provided to one or more users via one or more electronic devices 205A-205N carried by the one or more users and/or adjusting a capacity of one or more points of interest 206A-206N.

Although specific embodiments have now been described, the skilled person will understand that various modifications and variations are possible. For example, whilst the disclosure is described in relation to existing network architecture, it will be understood that changes to the architecture (and/or nomenclature) are possible, but the present disclosure may still be applicable in this case. All of the features disclosed herein may be combined in any combination, even if that combination has not been explicitly detailed, except combinations where at least some of such features and/or steps are mutually exclusive. In particular, the preferred features of the one or more illustrative aspects described herein are applicable to all aspects described herein and may be used in any combination. Likewise, features described in non-essential combinations may be used separately (not in combination).

Examples of mobile devices include various devices that transmit and receive user data and/or various kinds of control information to and from a base station. The mobile device may be referred to as a user equipment (UE), terminal equipment (TE), a mobile station (MS), a mobile terminal (MT), a user terminal (UT), a subscriber station (SS), a wireless device, a personal digital assistant (PDA), a wireless modem, a handheld device, etc.

The examples may be carried out on any suitable data processing device, such as a personal computer, laptop, mobile telephone, server, virtual machine, and the like. The above description of the systems and methods has been simplified for purposes of discussion and is intended to provide a specific example to illustrate the aspects described herein. Different types of systems and methods may be used, as will be appreciated by the skilled person. It will be appreciated that the boundaries between logic blocks are merely illustrative and that alternative embodiments may merge logic blocks or elements or may impose an alternate decomposition of functionality upon various logic blocks or elements.

Where this application refers to a server, for instance, this may actually be a pair of servers (primary and failover), for redundancy.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more FPGAs, and/or one or more ASICs, and/or one or more DSPs, and/or other hardware arrangements. Method steps implemented in flowcharts contained herein, or as described above, may each be implemented by corresponding respective modules. Moreover, multiple method steps implemented in flowcharts contained herein, or as described above, may be implemented together by a single module.

Examples may be implemented by computer software or a "computer program." A storage medium and a transmission medium carrying the computer software are also provided. The computer software may comprise one or more instructions, or code, that, when executed by a computer, causes the methods described to be performed. Computer software may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM, or a Blu-ray disc), or a memory (such as a ROM, a RAM, EEPROM, EPROM, Flash memory or a portable/removable memory device), etc. The transmission medium may be a communications signal, a data broadcast, a communications link between two or more computers, etc.

The computer program may be configured to control a server and/or mobile device to perform any method according to the disclosure. A server may also be provided, configured to operate in accordance with certain methods disclosed herein. For example, the server may include a processor and at least one communication interface, particularly comprising one or both of a transmitter and receiver. A mobile device (e.g., UE) may also be provided, configured to operate in accordance with certain methods disclosed herein. The mobile device may likewise include a processor and at least one communication interface, particularly comprising one or both of a transmitter and receiver.

Each feature disclosed in this specification, unless stated otherwise, may be replaced by alternative features serving the same, equivalent, or similar purpose. Thus, unless stated otherwise, each feature disclosed is one example only of a generic series of equivalent or similar features.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as a mobile device, a network entity, a step, a parameter, or a message) means "one or more" (for instance one or more mobile devices, one or more network entities, one or more steps, one or more parameters, or one or more messages). Throughout the description and claims of this disclosure, the words "comprise", "including", "having" and "contain" and variations of the words, for example "comprising" and "comprises" or similar, mean "including", and are not intended to (and do not) exclude other components.

The use of any and all examples, or exemplary language ("for instance", "such as", "for example" and like language) provided herein, is intended merely to better illustrate the one or more illustrative aspects described herein, and does not indicate a limitation on the scope of the disclosure unless otherwise claimed. No language in the specification should be construed as indicating any non-claimed element as essential to the practice of the one or more illustrative aspects described herein.

Any steps described in this specification may be performed in any order or simultaneously unless stated or the context requires otherwise. Moreover, where a step is described as being performed after a step, this does not preclude intervening steps being performed.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

A method of manufacturing and/or operating any of the devices disclosed herein is also provided. The method may comprise steps of providing each of the features disclosed and/or configuring or using the respective feature for its stated function.

In the drawings and specification, there have been disclosed typical embodiments and, although specific terms are employed, they are used in a generic and descriptive sense only and not for purposes of limitation, the scope of the one or more illustrative aspects described herein being set forth in the following claims.

The invention claimed is:

1. A method of managing user movement in an area, wherein the area comprises one or more of a plurality of points of interest or zones, the method comprising:
   receiving raw data relating to one or more users in the area and indicative of a geographic location of the one or more users, wherein the raw data comprises one or more of:
   geographic location data from electronic devices carried by the one or more users,
   signals from electronic gates indicating one or more of:
   entry of the one or more users to a point of interest;
   exit of the one or more users from a point of interest;
   entry of the one or more users to a zone;
   exit of the one or more users from a zone;
   entry of the one or more users to the area; or
   exit of the one or more users from the area,
   signals from one or more wireless beacons detecting electronic devices carried by the one or more users,
   signals from one or more interactive elements in the area, indicating interaction with the one or more users,
   reservation data indicating one or more points of interest the one or more users intend to visit at predetermined times and/or check-in data indicating that the one or more users have attended reservations or attended a point of interest without a reservation, data from one or more sales terminals indicating one or more financial transactions involving the one or more users, data from one or more imaging systems in the area indicating a location and/or direction or travel of the one or more users and/or indicating a number of users in a particular location, or feedback from the one or more users, deriving, using the raw data relating to the one or more users, characterising data relating to one or more derived characteristics of the one or more users;

forecasting, using a trained artificial intelligence model and the characterising data of the one or more users, one or more of user attendance at one or more of the points of interest or zones, or a number of users leaving the area, within a predetermined period; and responding to the forecasted user attendance by one or more of:

adjusting electronic signage within the area to guide users away from one or more of points of interest or zones that are forecasted to exceed a threshold proportion of their capacity and towards one or more of other points of interest or zones, adjusting navigation guidance provided to the one or more users via the electronic devices carried by the one or more users to guide the one or more users away from points of interest and/or zones that are forecasted to exceed a threshold proportion of their capacity and towards other points of interest and/or zones, or adjusting a capacity of a point of interest.

2. The method of claim 1, wherein forecasting one or more of user attendance at one or more of the points of interest or zones, or a number of users leaving the area, within a predetermined period comprises determining a likelihood of one or more of: each of the one or more users attending each of the one or more points of interest or zones, or each of the one or more users leaving the area within the predetermined period.

3. The method of claim 2, further comprising:

testing a plurality of candidate derived characteristics by assessing an impact of each derived characteristic on the likelihood of one or more of: the respective user attending each of the one or more points of interest or zones, or the respective user leaving the area, ranking the plurality of candidate derived characteristics based on the assessed ability of each derived characteristic to impact the likelihood, and selecting a subset of the plurality of candidate derived characteristics for providing to the trained artificial intelligence model.

4. The method of claim 2, further comprising:

notifying one or more users of relevant live information, wherein the information is determined to be relevant based on the likelihood of one or more of: the user attending each of the one or more points of interest or zones, or the user leaving the area within the predetermined period.

5. The method of claim 1, further comprising:

testing a plurality of candidate artificial intelligence models using test data comprising test characterising data and corresponding test user attendance data; and selecting an artificial intelligence model from the plurality of candidate artificial intelligence models that best forecasts the test user attendance data based on the test characterising data.

6. The method of claim 5, wherein the plurality of artificial intelligence models comprises one or more of the following types of models:

logistic regression,
neural network,
recurrent neural network,
long short-term memory,
convolutional neural network,
k-means,
support vector machine,
k-nearest neighbours,
random forest,
decision tree,
XGBoost, or
large language model.

7. The method of claim 5, wherein the plurality of artificial intelligence models comprises a plurality of models of the same type and having different values of one or more of the following hyperparameters:

creativity,
answer length,
gamma,
tree method,
penalty,
regularization strength,
solver algorithm,
maximum number of iterations,
class weight,
multi-class handling,
dual or primal formulation,
tolerance,
random state,
learning rate,
batch size,
number of epochs,
number of hidden layers,
neurons per layer,
regularization,
dropout rate,
activation functions,
weight initialization,
optimizer,
loss function,
number of layers,
sequence length,
gradient clipping,
number of convolutional layers,
number of filters,
kernel size,
strides,
padding,
pooling,
number of clusters,
initialization method,
number of initializations,
maximum number of iterations,
convergence tolerance,
random seed,
algorithm type,
kernel type,
regularization parameter,
kernel coefficient,
degree,
class weights,
tolerance,
kernel cache size,
shrinking, cross-validation,
number of neighbours,
distance metric,
weights,
algorithm,
leaf size,
parallelization,
power parameter for the Minkowski metric,
cross-validation,
number of trees,
maximum depth of tree,
minimum number of samples per leaf,
quality of a split,
minimum number of samples per split,
maximum features,
bootstrap samples,
the randomness of the bootstrapping of the samples,
out-of-bag samples,
criterion,
maximum depth,
minimum samples per split,
minimum samples per leaf,
maximum number of features,
random state,
class weight,
learning rate,
minimum loss reduction,
fraction of samples,
minimum child weight,
regularisation parameters,
random seed,
objective function,
balance of positive and negative weights,
model size,
max output tokens,
decoding type,
top-k and top-p sampling,
temperature,
stop sequences, or
frequency and presence penalties.

8. The method of claim 1, wherein forecasting user attendance using a trained artificial intelligence model comprises forecasting a plurality of intermediate outcomes using a plurality of trained artificial intelligence models and combining the plurality of intermediate outcomes to obtain a likelihood of one or more of: the user attending each of the one or more points of interest or zones, or the user leaving the area within the predetermined period.

9. The method of claim 1, further comprising training the artificial intelligence model using historical attendance data and historic characterizing data of the one or more users.

10. The method of claim 1, further comprising updating the artificial intelligence model using real-time attendance data and characterizing data of the one or more users.

11. The method of claim 1, further comprising:
defining a boundary around the area,
wherein a user is defined as leaving the area if they travel outside the defined boundary.

12. The method of claim 1, wherein the raw data further comprises one or more of:
accommodation information relating to the one or more users,
data relating to the one or more users retrieved from one or more external databases,
preference data associated with the one or more users, or
environmental data.

13. The method of claim 1, wherein the one or more derived characteristics comprise one or more of:
user food and/or drink preferences,
user mood,
proximity to a point of interest, or
proximity to an exit of the area.

14. The method of claim 1, further comprising one or more of:
adjusting environmental conditions in response to the forecast data;
presenting the forecast data via a dashboard display interface; or
presenting a tailored offer to a user, based on the forecast data.

15. A management system configured to:
receive raw data relating to one or more users in the area and indicative of a geographic location of the one or more users, wherein the raw data comprises one or more of:
geographic location data from electronic devices carried by the one or more users,
signals from electronic gates indicating one or more of:
entry of the one or more users to a point of interest;
exit of the one or more users from a point of interest;
entry of the one or more users to a zone;
exit of the one or more users from a zone;
entry of the one or more users to the area; or
exit of the one or more users from the area,
signals from one or more wireless beacons detecting electronic devices carried by the one or more users,
signals from one or more interactive elements in the area, indicating interaction with the one or more users,
reservation data indicating one or more points of interest the one or more users intend to visit at predetermined times and/or check-in data indicating that the one or more users have attended reservations or attended a point of interest without a reservation,
data from one or more sales terminals indicating one or more financial transactions involving the one or more users,
data from one or more imaging systems in the area indicating a location and/or direction or travel of the one or more users and/or indicating a number of users in a particular location, or
feedback from the one or more users,
derive, using the raw data relating to the one or more users, characterising data relating to one or more derived characteristics of the one or more users;
forecast, using a trained artificial intelligence model and the characterising data of the one or more users, one or more of user attendance at one or more of the points of interest or zones, or a number of users leaving the area, within a predetermined period; and
respond to the forecasted user attendance by one or more of:
adjusting electronic signage within the area to guide users away from one or more of: points of interest or zones that are forecasted to exceed a threshold proportion of their capacity and towards one or more of other points of interest or zones,
adjusting navigation guidance provided to the one or more users via the electronic devices carried by the one or more users to guide the one or more users away from one or more of points of interest or zones that are forecasted to exceed a threshold proportion of their capacity and towards other points of interest and/or zones, or adjusting a capacity of a point of interest.

16. A non-transitory computer-readable medium storing instructions that, when executed on a processor, cause the processor to:

receive raw data relating to one or more users in the area and indicative of a geographic location of the one or more users, wherein the raw data comprises one or more of:

geographic location data from electronic devices carried by the one or more users, signals from electronic gates indicating one or more of:
entry of the one or more users to a point of interest;
exit of the one or more users from a point of interest;
entry of the one or more users to a zone;
exit of the one or more users from a zone;
entry of the one or more users to the area; or
exit of the one or more users from the area, signals from one or more wireless beacons detecting electronic devices carried by the one or more users, signals from one or more interactive elements in the area, indicating interaction with the one or more users, reservation data indicating one or more points of interest the one or more users intend to visit at predetermined times and/or check-in data indicating that the one or more users have attended reservations or attended a point of interest without a reservation, data from one or more sales terminals indicating one or more financial transactions involving the one or more users, data from one or more imaging systems in the area indicating a location and/or direction or travel of the one or more users and/or indicating a number of users in a particular location, or feedback from the one or more users, derive, using the raw data relating to the one or more users, characterising data relating to one or more derived characteristics of the one or more users;

forecast, using a trained artificial intelligence model and the characterising data of the one or more users, one or more of user attendance at one or more of the points of interest or zones, or a number of users leaving the area, within a predetermined period; and respond to the forecasted user attendance by one or more of:

adjusting electronic signage within the area to guide users away from one or more of: points of interest or zones that are forecasted to exceed a threshold proportion of their capacity and towards one or more of other points of interest or zones, adjusting navigation guidance provided to the one or more users via the electronic devices carried by the one or more users to guide the one or more users away from one or more of points of interest or zones that are forecasted to exceed a threshold proportion of their capacity and towards other points of interest and/or zones, or adjusting a capacity of a point of interest.

* * * * *